United States Patent [19]

Demeo

[11] Patent Number: 5,397,867
[45] Date of Patent: Mar. 14, 1995

[54] LIGHT DISTRIBUTION FOR ILLUMINATED KEYBOARD SWITCHES AND DISPLAYS

[75] Inventor: Gregory B. Demeo, Williamsburg, Va.

[73] Assignee: Lucas Industries, Inc., Reston, Va.

[21] Appl. No.: 35,967

[22] Filed: Mar. 23, 1993

Related U.S. Application Data

[63] Continuation-in-part of Ser. No. 940,988, Sep. 4, 1992, abandoned.

[51] Int. Cl.⁶ .............................................. H01H 9/18
[52] U.S. Cl. ................................. 200/5 A; 200/512; 200/311; 200/314
[58] Field of Search .............. 200/5 R, 5 A, 511, 512, 200/310, 311, 312, 313, 314

[56] References Cited

U.S. PATENT DOCUMENTS

| | | | |
|---|---|---|---|
| 3,963,489 | 4/1975 | Cho | 96/27 R |
| 4,149,773 | 4/1979 | Reid | 350/163 |
| 4,336,978 | 6/1982 | Suzuki | 350/167 |
| 4,551,598 | 11/1985 | Hamilton et al. | 200/314 |
| 4,811,175 | 3/1989 | DeSmet | 362/95 |
| 4,963,933 | 10/1990 | Brownlee | 355/218 |

Primary Examiner—Marc S. Hoff
Assistant Examiner—Michael A. Friedhofer
Attorney, Agent, or Firm—Nixon & Vanderhye

[57] ABSTRACT

Disclosed is the backlit display and/or backlit keyboard display which have a controlled level of illumination at the surface thereof. Where such switch and/or display are illuminated by a light emitting diode, the present invention interposes an optical filter between the light emitting diode and the surface of the cover. The optical filter contains a pattern thereon having a variable density distribution of opaque material which in a preferred embodiment is densest in the area closest to the light emitting diode and decreases in density in areas away from the light emitting diode. In a preferred embodiment the optical filter is a "negative" of the illumination without a filter present. The result in both the switch and display embodiments is a substantially constant level of illumination across the surface of the cover. Further disclosed is at least one slot in translucent layers which may be incorporated in a switch or display which reduces "crosstalk" between switches and/or displays. Additionally the use of a reflective material as the optical filter, in combination with and separated from a reflective layer near the LED by a separator layer, provides increased illumination of the display or switch.

38 Claims, 6 Drawing Sheets

LIGHT DISTRIBUTION FOR ILLUMINATED KEYBOARD SWITCHES AND DISPLAYS

The present application is a continuation-in-part of U.S. patent application Ser. No. 07/940,988, entitled "Improved Light Distribution For Illuminated Keyboard Switches And Displays" filed on Sep. 4, 1992, now abandoned on behalf of inventor Gregory B. Demeo.

BACKGROUND OF THE INVENTION

1. Field of the Invention

The present invention relates generally to illuminated keyboard switches and displays and more particularly to such switches and displays illuminated by means of light emitting diodes (LEDs).

2. Discussion of Prior Art

With the proliferation of portable cellular telephones and other keypads and/or keyboards having backlit keys and displays, there is a need to provide a controlled distribution of light across the surface of the key or display.

Keypad switches, often times referred to as multilayer backlit membrane switches such as those discussed and described in U.S. application Ser. No. 07/669,958 filed Mar. 15, 1991 entitled "BACKLIT TACTILE KEYBOARD WITH IMPROVED TACTILE AND ELECTRICAL CHARACTERISTICS", are well known in the art.

Figure 1:
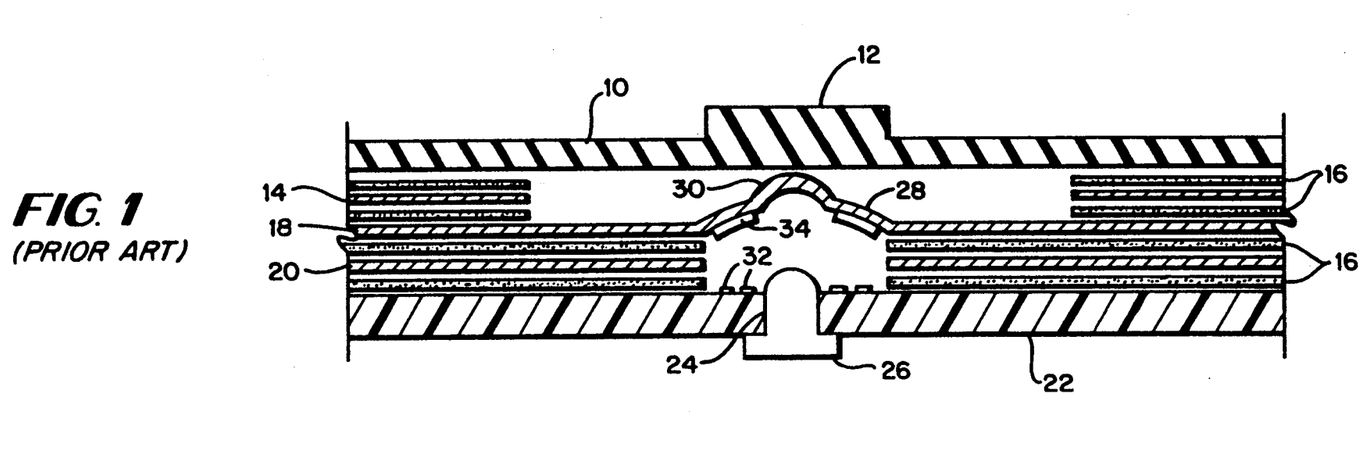
FIG. 1 is a side view partially in section of a prior art backlit membrane switch.

FIG. 1 of the present application illustrates one embodiment of a membrane switch disclosed in the '958 application (it is identified as FIG. 4) and while there are numerous other modifications and variations on membrane switches discussed in other applications and prior art disclosures, the problem with respect to illuminating such backlit switches and computer displays remains with all such devices.

The prior art membrane switch disclosed in FIG. 1 comprises a number of individual elements. A rubber keypad cover 10 is provided which has raised keys 12 located thereon. In a preferred embodiment, the keypad cover is bonded to an actuator spacer 14 by an adhesive layer 16. The actuator spacer is also bonded to a conductive dome membrane which in turn is mounted to spacer 20 with additional adhesive 16. Spacer 20 is in turn mounted to printed circuit board 22 by a further adhesive layer 16.

As shown in FIG. 1, the printed circuit board has a plurality of apertures 24 through which extends light emitting diode 26. The conductive dome membrane includes a large radius dome 28 and a small radius dome 30. Conductive traces 32 on the printed circuit board comprise the elements of the switch which are shorted by conductive material, 34 located on the lower surface of the large radius dome. The large radius dome serves to short the conductive traces 32 when raised key 12 is depressed. The large radius dome inverts and the conductive material 34 physically bridges across the conductive traces 32.

A further embodiment of a membrane switch is also illustrated in U.S. Ser. No. 07/751,185 filed Aug. 29, 1991 which is a continuation-in-part from the previously mentioned '958 application. In the continuation-in-part, a membrane switch is illustrated which does not rely upon the bridging of conductive traces 32 but rather has one conductor electrically connected to the printed circuit board and located on the lower surface of the conductive dome or alternatively in a separate shorting layer with the other conductor located on or adjacent the printed circuit board.

In either the '958 and '185 applications as well as in other known backlit membrane switch embodiments, the light emitting diode 26 provides a high level of illumination for its size. However, directly above the bulb, as would be expected, the light intensity is greatest but as one moves along the lower surface of the cover 10 away from the point directly over the light emitting diode, the intensity decreases dramatically until the edge of the spacer or other opaque material is reached, at which point the light intensity decreases to zero.

Figure 2:
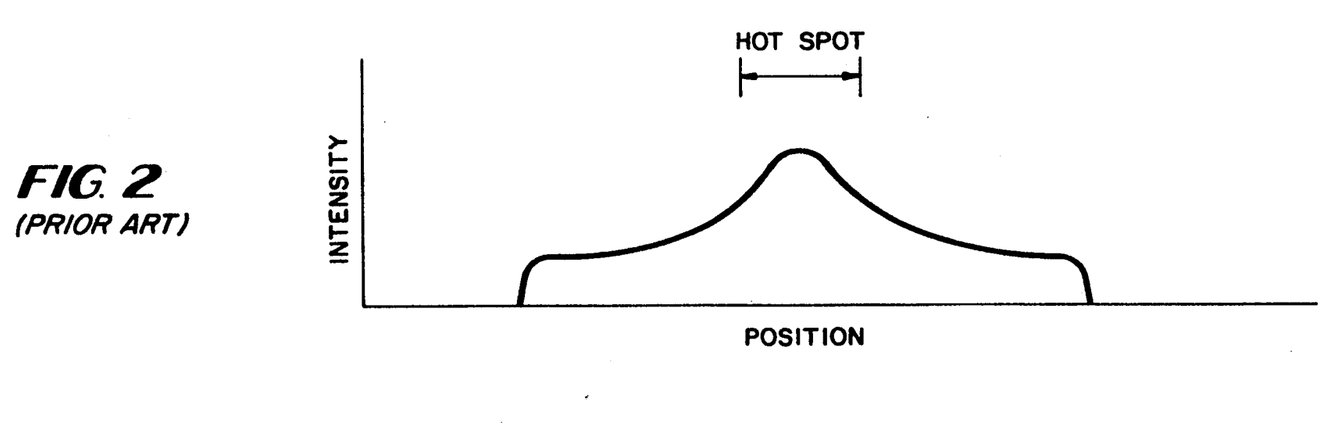
FIG. 2 is a graph of intensity versus position for the backlit membrane switch of FIG. 1.

FIG. 2 illustrates the variation in light intensity (on the vertical scale) with respect to position where the position indicated corresponds to the position related to the light emitting diode in FIG. 1. Often times the maker of membrane switches will provide a cover which is not transparent but merely translucent which, as a result, tends to diffuse the light intensity somewhat. In fact, in the embodiment of FIG. 1, if a diffusing rubber were utilized as the keyboard cover, the consequence of having the raised key 12 would be that there would be much greater diffusion directly over the LED and less diffusion elsewhere. However, even in this circumstance, there would be a "hot spot" or a significant change in intensity of the LED as perceived by an operator using such a key.

Reflective Mylar films having half tone patterns thereon are known for use in combination with fluorescent lamps to provide a relatively even light distribution for backlit inspection tables. The Mylar film has a pattern of metalization which reflects a greater amount of light in the vicinity of the fluorescent light bulb and a lesser amount of light a distance away from the light bulb resulting in a more even distribution of light transmitted therethrough.

While the keypad/membrane switch industry has obviously flourished without solving the problem of intensity variations along the keys. However, many times a key includes indicia (alpha numeric characters or other keyboard symbols) printed on or molded into the key. If the key were more uniformly illuminated, the visual perception of such indicia by the operator would be improved. Computer keypads, keyboards and other elements are also using to a greater degree display areas which are illuminated by one or more light emitting diodes. The same problems exist in that, over the display area, there will be a wide variation in illumination intensity caused by the "hot spots" associated with the individual light emitting diodes utilized.

A further problem occurs in many prior art keypads in that where some keys are illuminated and other keys aren't, there is a sufficient amount of light bleed through or "crosstalk" between keys that it is difficult to determine which key is actually illuminated and which key is not. Similarly, where keys are illuminated with different colors, the "crosstalk" between adjacent keys serves to confuse the color coding.

SUMMARY OF THE INVENTION

In accordance with the above difficulties with backlit membrane switches and backlit keyboard displays, it is an object of the present invention to provide a more uniformly illuminated backlit membrane switch and/or backlit keyboard display.

It is a further object of the present invention to provide a more uniformly illuminated backlit membrane switch without substantially increasing the thickness of such a switch.

It is a still further object of the present invention to provide an ability to control intensity and hue of keys having a predetermined color or hue.

It is an additional object of the present invention to reduce bleed through of light and/or different colors between adjacent keys in a keyboard.

The above and other objects are achieved in accordance with the present invention by providing, between the light emitting diode and the keypad cover, a variable optical filter layer having a predetermined portion of opaque material per unit area so as to reduce the intensity of light being transmitted through the keypad cover. In a preferred embodiment, the density of opaque material per unit area decreases as the intensity of light reaching the cover from the light emitting diode decreases so as to maintain a substantially constant level of illumination at the cover.

In a preferred embodiment, the opaque material of the optical filter comprises a number of dots where the number and/or size of the dots changes per unit area so as to achieve a substantially uniform illumination of the lower surface of the keypad cover. This can be easily accomplished by creating the optical filter from a photographic "negative" of the non-filtered illumination from the light source through the cover.

In another embodiment, the negative can be used in exposing photoresist protected reflective material. In the "light" areas, the photoresist and reflective material is etched away allowing a translucent path for light. In the "dark" areas the reflective material is maintained, with the resulting optical filter providing a uniform illumination when the processed reflective material is positioned over the light source.

In a further preferred embodiment, the opaque material is a reflective material and the light source is mounted on or in a reflective substrate. The substrate and the cover are separated by a translucent layer such that light which does not pass through spaces between the reflective material on the variable transmittance layer is reflected back towards the substrate whereupon it is reflected back towards the cover. This extra double reflection permits light which would ordinarily be blocked by the opaque material in the optical filter, to be reflected and reradiated towards the cover thereby increasing the overall illuminance.

A further preferred embodiment decreases "crosstalk" between adjacent keys by providing slots or grooves surrounding the light source in the light transmissive layers beneath the key. The existence of the slot causes radiation of any light being "piped" through the translucent layer and causes this to be radiated towards the key cover rather than towards an adjacent key.

BRIEF DESCRIPTION OF THE DRAWINGS

The above and other objects of the present invention will be better understood by reference to the following drawings wherein.

DETAILED DESCRIPTION OF THE DRAWINGS

Similar reference numerals will be used in the respective Figures for similar parts.

Figure 4:
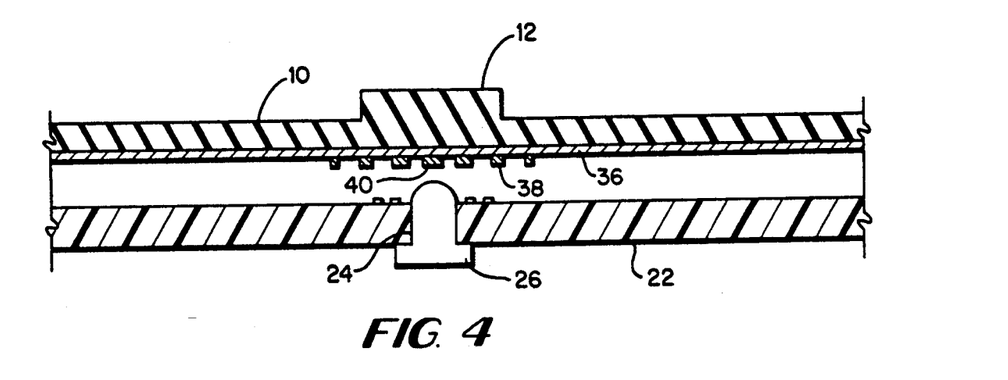
FIG. 4 is a side cross-sectional view of the switch of FIG. 1 with the variable optical filter of FIG. 3.

FIG. 4 illustrates the backlit membrane switch of FIG. 1 although the actuator layer, the dome membrane layer and various spacer and adhesive layers have been omitted for clarity of illustration. In accordance with the present invention, an optical filter comprised of variable transmittance layer 36 is included between light emitting diode 26 and the keypad cover 10, preferably along the lower surface of the keypad cover.

The variable transmittance layer includes a pattern of opaque material 38 (which in a preferred embodiment could be a visible light reflective material) located thereon which serves to vary the transmittance through layer 36. The opaque material could be printed or otherwise applied to the layer 36 (i.e. silver or other ink printed in the desired configuration) or it can be a uniform metallized coating which has been selectively etched away (aluminized Mylar film).

For illustration's sake in FIG. 4, the thickness and width of each of the elements of the opaque material 38 has been exaggerated, in an actual embodiment these would be extremely small such that any "shadow" created by their position between LED 26 and raised key 12 is not visibly apparent at the external surface of the raised key to the operator/user.

Figure 3:
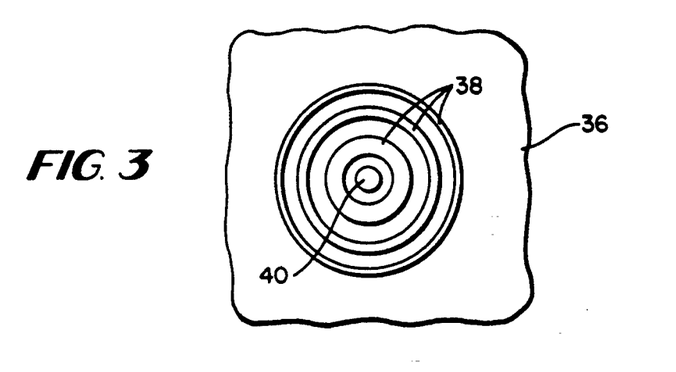
FIG. 3 is a bottom plan view of a variable optical filter in accordance with the present invention.

While the pattern in the embodiment shown in FIG. 4 is illustrated in FIG. 3, it is only necessary that the density distribution (defined as the percentage area of opaque material per unit area) vary as the light intensity distribution from the LED varies along the lower surface of the layer. Obviously, where there is the highest level of illumination, the percentage of opaque material would be greatest. As position changes along the keypad cover and the intensity of illumination from the light emitting diode decreases, so would the density distribution of opaque material so as to achieve a uniform level of illumination.

Figure 5:
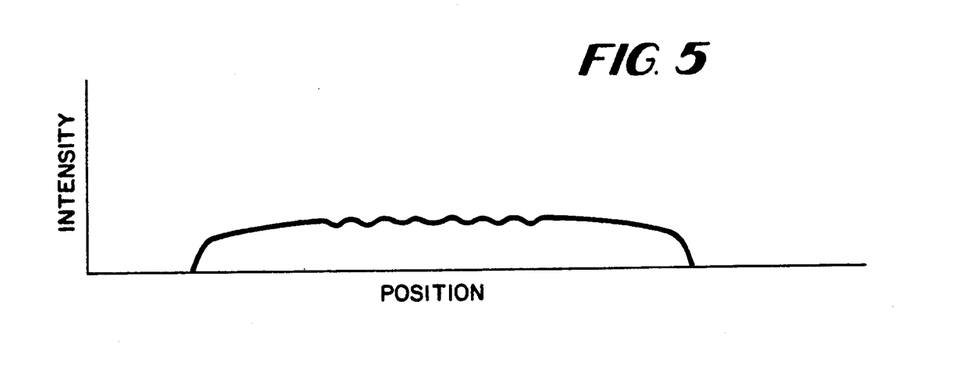
FIG. 5 is a graph of intensity of light received at the lower surface of the keypad cover in the embodiment disclosed in FIG. 4.

For example, in the immediate vicinity of the light emitting diode, 50% or more of the light passing through variable transmittance layer 36 might be blocked, whereas, at the outer edges of the illuminated keypad cover, there may be no blockage of light. In this fashion, if the light illumination at the center is two or more times the level at the outside edge of the keypad, the resultant level of illumination perceived by the operator will be relatively uniform. FIG. 5 illustrates that while there are minor variations in intensity across the raised key (due to the pattern of opaque material thereunder), the average illumination remains relatively constant (the minor variations would not be perceived by an operator).

Alternatively, it may be desirable to have a greater degree of illumination around the periphery of the raised key with a lower level in the center. Thus, the design would have an even higher percentage of light blockage in the center portion of the key and have almost no light blockage around the periphery of the raised key in order to get the brightest visual image therefrom.

A review of the pattern shown in FIG. 3 will indicate an increasing space between the opaque rings as well as a decreasing width of the rings, as one moves outward from the center. The central dot 40 can also vary in size depending upon the desired density distribution which, if constant illumination across the key is desired, will depend in turn upon the intensity distribution of light emitted from the light emitting diode.

Figure 11:
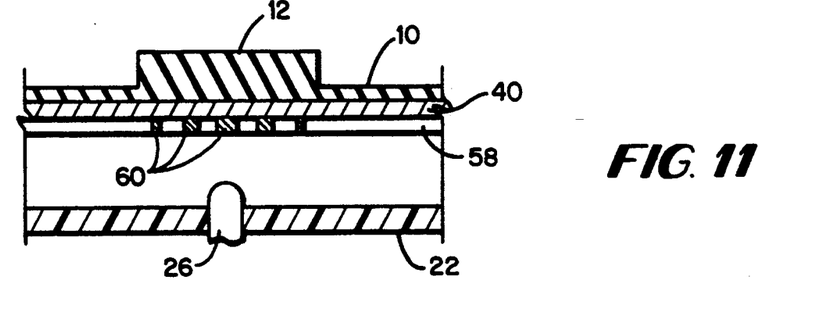
FIG. 11 is a side view partially in section of a further embodiment of the present invention.

While both the thickness and width of the opaque materials in the pattern of FIG. 3 as shown in FIG. 4 is exaggerated, the actual size and configuration is not critical. It is, however, desirable to make the opaque features small enough such that shadows caused thereby are not perceived by the operator viewing the top cover. While variable transmittance layer 36 in FIG. 4 is transparent and the variable transmittance comes from the pattern of opaque material 38 and 40 disposed thereon, it could also be a diffusion layer which would tend to average out differences between illumination being supplied to the lower surface of cover 10. FIG. 11 includes a layer 40 which comprises a diffuser layer having the property of mixing or averaging variations in illumination before such illumination reaches the lower surface of cover 10. Various types of material such as "frosted" polyethylene, Mylar, etc. could be used for this diffuser layer.

Figure 6:
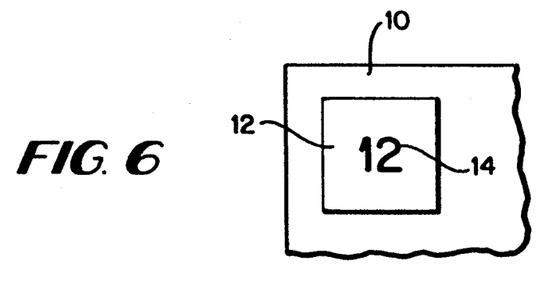
FIG. 6 is a top plan view of a membrane switch.
Figure 7:
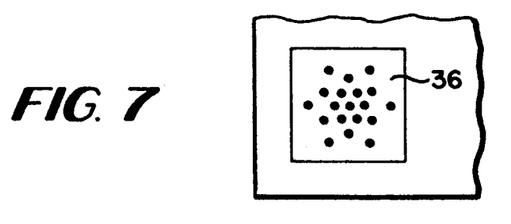
FIG. 7 is a bottom plan view of one embodiment of the variable optical filter in accordance with one embodiment of the present invention.
Figure 8:
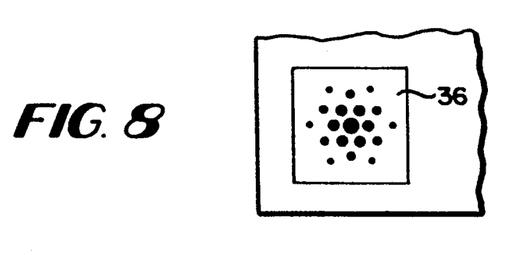
FIG. 8 is a bottom plan view of a further embodiment of the present invention.

FIG. 6 illustrates a keypad cover having a raised key 12 with visible indicia thereon. FIGS. 7 and 8 illustrate bottom views of the variable transmittance layer 36 which would be used in conjunction with the single light emitting diode to create a substantially constant level of illumination at the bottom surface of cover 10.

In FIG. 7, a plurality of opaque dots (in a preferred embodiment circular) are printed on the variable transmittance layer 36 where each of the dots has the same size. It can be seen that there is higher density of dots in the center portion of the variable transmittance layer so as to provide a greater density distribution of opaque material directly over the light emitting diode. As the position moves out away from the point of highest intensity from the light emitting diode, however, the spacing between the dots increases resulting in a lower density distribution of opaque material. This, in combination with the light emitting diode 26 in the FIG. 4 embodiment, would also provide a substantially constant level of illumination.

FIG. 8 illustrates an essentially constant spacing of dots from one another, although the size of the dots decreases as one moves outward from the center. This, again, would provide a substantially constant level of illumination across the cover. The result would be similar in that there would be an increased density distribution of opaque material where illumination by the LED is highest with a reduced density distribution of material where illumination is lower.

Figure 9:
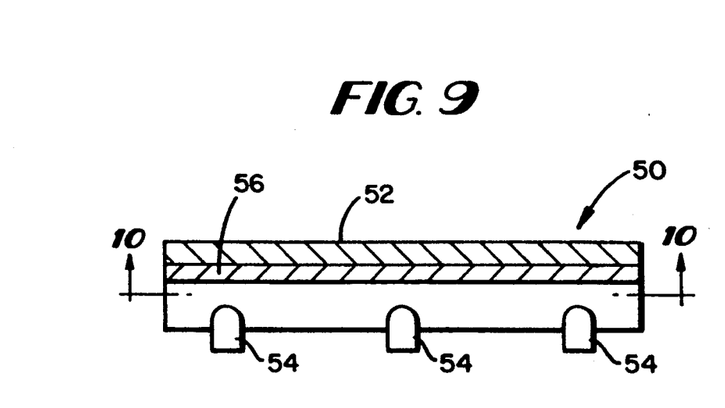
FIG. 9 is a side view partially in section of a backlit keyboard display in accordance with the present invention.
Figure 10:
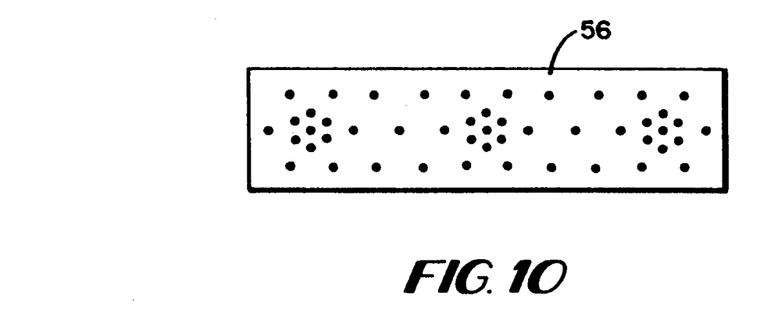
FIG. 10 is a view of FIG. 9 along section lines 10—10.

FIG. 9 illustrates a backlit keyboard display in general where there is included a cover 52, a plurality of light emitting diodes 54 and a variable transmittance layer 56. The opaque material deposited on layer 56 has a negligible thickness and is not shown in FIG. 9 but is illustrated in FIG. 10 which is a view of the variable transmittance layer from the underside. It is noted that there are three separate patterns similar in nature to the pattern disclosed in FIG. 7 with the patterns repeating and located one over each of the respective three light emitting diodes making up the backlit keyboard display. The patterns shown in FIG. 10 accomplish precisely the same purpose as the pattern illustrated in FIG. 7 except that it provides for a substantially constant level of illumination over a surface which is exposed to three Separate light emitting diodes.

It is noted that the optical filter comprised of variable transmittance layer 56 could be comprised of a material which absorbs a certain percentage of light where the absorption is related to the thickness of the material. If the materials were then molded such that it were thicker in the vicinity of the light emitting diodes and thinner away from the light emitting diodes, it would provide the desirable constant level of illumination at the cover without the necessity of printing or etching an opaque material on the variable transmittance layer.

Furthermore, while applicant's preferred embodiment relates to providing a substantially constant level of illumination to the cover of a membrane switch or a backlit computer display, there remains a problem with respect to providing proper illumination for displays of a selected visual frequency, i.e. color. This embodiment could be utilized to provide a constant level of illumination to the cover and then the cover could be a translucent colored material, thus providing a desired uniform color display.

Another embodiment of applicant's invention is illustrated in FIG. 11 where, in addition to the utilization of a diffuser layer as previously discussed, there is also a variable transmittance layer 58 which is transparent to the desired visible frequency, i.e. color, which is desired to be seen by the operator at raised key 12. The variable transmittance layer 58 would, however, absorb or block from transmittance all other frequencies. In addition, the optical filter pattern 60 is made up of a material which absorbs the preselected frequency as well as other frequencies so as to render substantially constant the level of illumination of the specific frequency at the lower surface of the cover 10. Thus, the optical filter could be utilized to provide one color at one raised key with a different color being provided at an adjacent raised key where both raised keys are formed from the same integral keypad cover (without requiring colored inserts to be molded therein, etc.).

Figure 12:
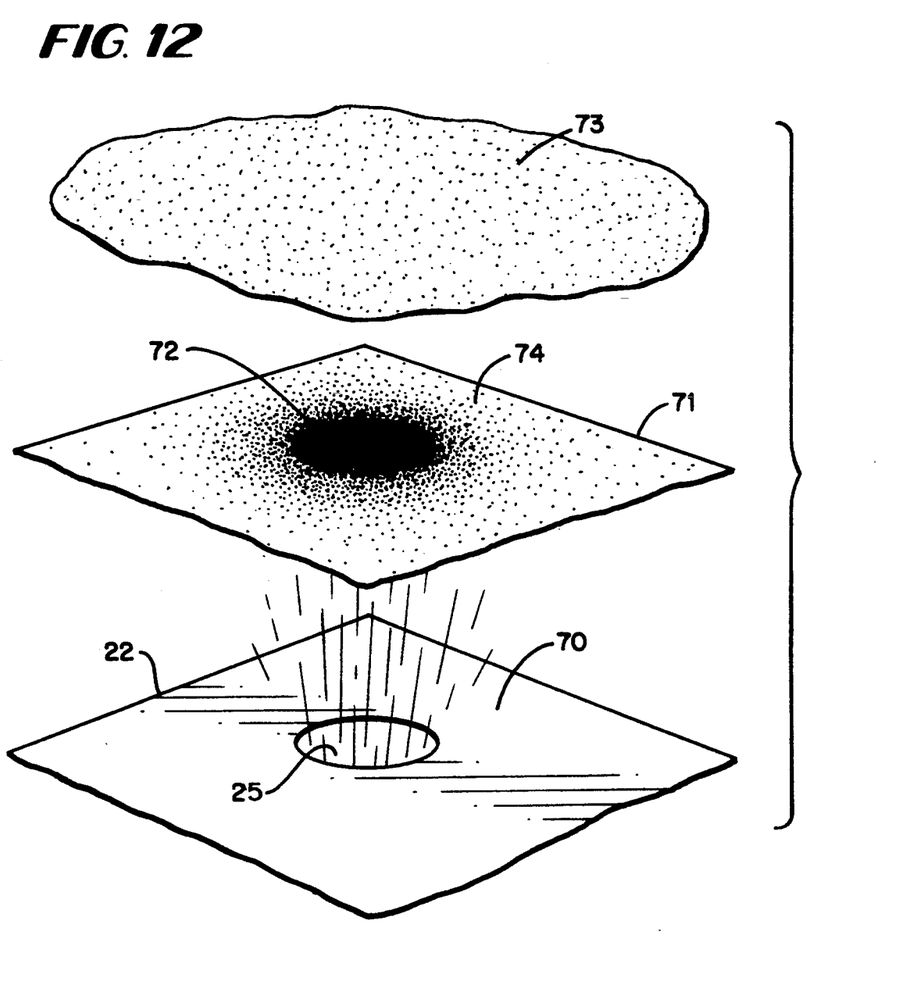
FIG. 12 is a perspective view of the normal light emission from an illuminated keypad, a photographic negative of the normal light emission, and the resultant uniform light emission when the negative is located over the illuminated keypad.

FIG. 12 illustrates a manner for achieving an optimum filter based upon visible light transmitted by the light emitting diode 26. The printed circuit board 22 is shown in a perspective view of one key or display area without any means for modifying the light intensity distribution in place. The light 25 from the light emitting diode 26 (not shown) is indicated by the white circle in the middle of the display while 70 represents the portion of the printed circuit board which is dark relative to the light 25 from the light emitting diode 26. As shown the illumination from diode 26 is not a sharp edged circle but rather would decrease gradually from the area of the LED to the darker surrounding areas.

A negative 71 of the illumination distribution from the light emitting diode 26 is created by conventional photographic techniques. The negative is the reverse of the illumination distribution where the darker central portion 72 represents the "negative" of the area of the highest illumination (from diode 26) and the lighter surrounding area 74 represents the "negative" of the dark area 70 surrounding diode 26.

It can be seen that if the negative 71 is located on the undersurface of switch cover 10 and which in turn is located over the switch substrate, the areas of higher illumination will have a greater degree of visible light blockage (due to the "negative") and the areas of lower intensity will have less blockage permitting a greater portion of illumination to pass through to the key cover.

The resultant extremely uniform level of illumination is represented by the even shading 73 in the imaginary plane over the area covered by the "negative" 71. Of course, indicia, coloration and other designs could be added to or combined with the "negative" 71 such that the resultant display (at the imaginary plane 73) or through either a backlit display or a backlit membrane switch is uniformly illuminated as well as providing a clear indication of the design or color desired.

Figure 13A:
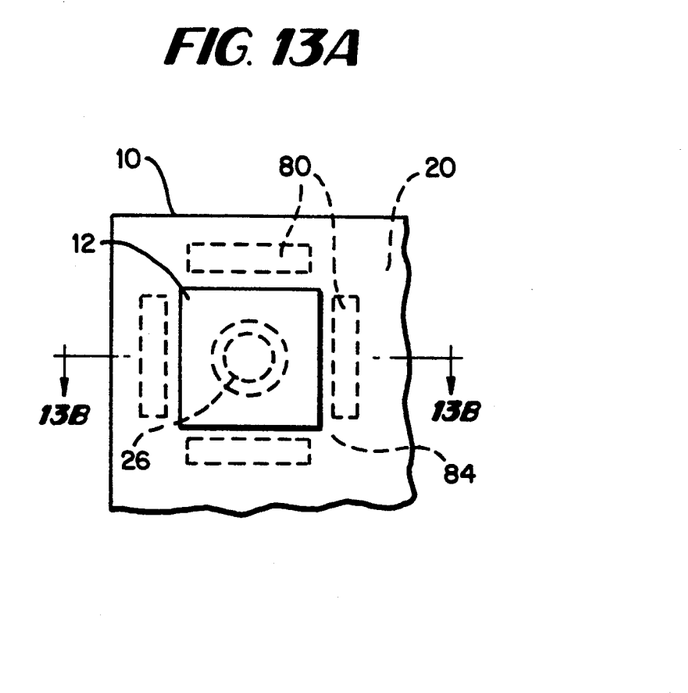
FIGS. 13(A) and (B) are a top view and a partial section view of a slotted translucent layer between the keypad and the light source in accordance with a further embodiment of the present invention.
Figure 13B:
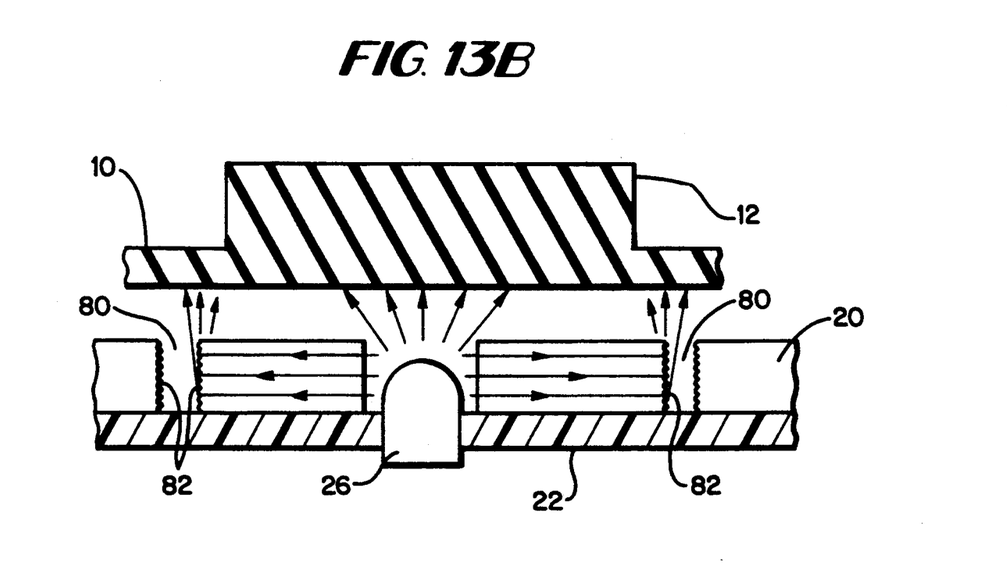

A method of reducing "crosstalk" between adjacent illuminated keys is disclosed in FIGS. 13A and 13B. 13A is top view and 13B is a side view partially in section of a membrane switch and/or is a backlit membrane switch and/or backlit display where the switch portions, as disclosed in FIG. 1, have been deleted for clarity. The LED 26 is mounted either on or through printed circuit board 22 and the keypad cover 10 having raised key 12 thereon is located thereabove as previously discussed.

Spacer layer 20, which in part separates cover 10 from circuit board 22, has a series of slots 80 located therein around the periphery of LED 26. These slots can be stamped, drilled, routed, molded or otherwise provided in the spacer layer 20. Depending upon the manner in which the slots 80 are provided, the edges of the slots 82 may be rough compared to the surface finish of the spacer 20.

While the spacer, and indeed other layers in multilayer backlit membrane switches and in display materials, are necessary for the proper orientation of the components, unfortunately they can serve as a "light pipe" to conduct light from LED 26 toward adjacent keys thereby causing them to be partially illuminated even when their respective LED is not energized. Where the generate specific colors, colored light being "piped" in from an adjacent key can serve to degrade the color generated by the respective LED at an adjacent switch or display position.

As can be seen in FIG. 13B, light generated by LED 26 which illuminates the cover 10 and raised key 12 travels directly to the key as shown by the generally upward arrows. However, light is also piped through spacer 20 as indicated by the arrows which are generally horizontal and parallel to printed circuit board 22. When this light reaches a slot 80, the piping of light through spacer 20 is interrupted and, in a preferred embodiment, if the edge of the slot is roughened (as created when the slot is drilled or routed), the variations in angle of the roughened surface serve to distribute the light in all directions (in much the same manner that a "frosted" surface does).

A portion of the "piped" light is directed upwards and can serve to increase illumination of the cover 10 and raised key 12 as shown by the generally vertically directed arrows from the inner surfaces of slots 80. However, some light will be directed towards substrate 22 and only a small portion of light will be directed across the slot and onto the outer edge of the slot in spacer 20. Again, if this outer edge is roughened, the angle at which light is "piped" into the outer portion of spacer 20 will also be varied causing any light piped in to be directed either towards the upper surface of spacer 20, towards substrate 22 with only a small portion of any such light being carried to an adjacent key or display. As a consequence, slots 80 serve as a barrier to "crosstalk" between adjacent displays and/or raised keys.

It is noted that the slots do not extend completely around LED 26 and therefore the spacer layer 20 is made as a single piece. The area 84 between the slots serves to join the inner and outer portions of spacer 20 together for ease of manufacture. The areas 84 can also be used to carry conductive traces especially where the preferred embodiment may be a backlit membrane switch key.

While the slots 80 have been shown by way of example to be only in the spacer 20, such slots could also be in the actuator spacer 14, adhesive layers and/or other layers of a multi-layer membrane switch where any such layer can act as a "light pipe" with respect to light generated by the light emitting diode 26. Further, although the slots are shown as being located just outside of the bounds of the key 12 they could be positioned at any desired location where it is desirable for the light piping effect is to be disturbed.

In order to most completely isolate a light emitting diode 26 from other display and/or raised key areas, the slot 80 could be one continuous slot looping around the light emitting diode with only a single area 84 connecting the inner portion of the spacer to the outer portion of the spacer.

As can be seen in FIGS. 13A and 13B, each LED on a backlit membrane switch or display can be effectively isolated from light generated by an adjacent LED improving the contrast between keys and/or displays on a keyboard or display system.

It can be seen that the opaque patterns discussed in FIGS. 4, 7, 8, 10 and 12 serve to insure a more uniform intensity of illumination from a backlit key or display. However, light which is blocked by an opaque or reflective material (such as material 38 and 40 in FIG. 4) is light which will, not travel through cover 10 (and key 12) thus the optical filter will decrease the overall illumination of the key. Applicant has found that the utilization of a spacer (which is usually present in membrane switches and displays) and an additional partially reflective layer (located near the light emitting diode) can serve to reflect back toward the keyboard cover light which is reflected from the optical filter.

Figure 14:
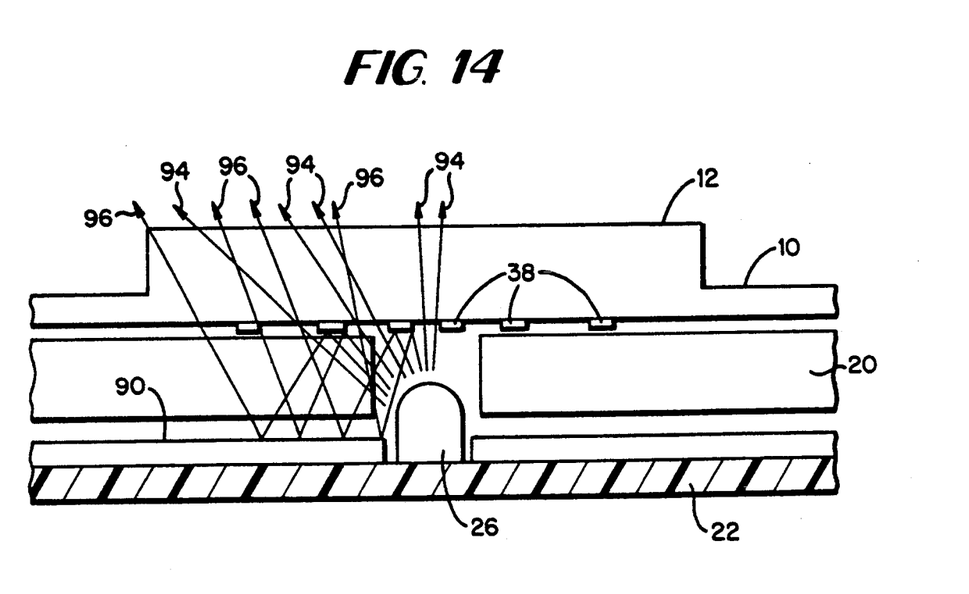
FIG. 14 is a side view partially in section of a further embodiment of the present invention.

For example, FIG. 14 illustrates a printed circuit board in which the diode 26 is mounted on the board itself. The opaque material layer 38 comprises a reflective material (such as aluminization) which is applied to the undersurface of cover 10, although it could as easily be applied to a separate layer 36 as shown in FIG. 4. Additionally, a separate reflective layer 90 (which in a preferred embodiment could be a separate aluminized layer or a matte white layer) is located adjacent printed circuit board 22 and serves to reflect upwards any light from the diode which is reflected downward by reflective elements 38.

Figure 15:
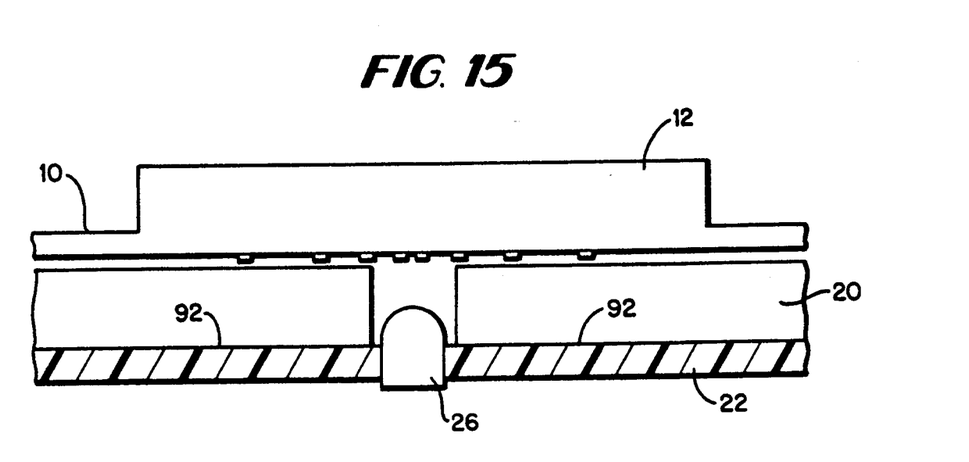
FIG. 15 is a side view partially in section of a further embodiment of the present invention.

FIG. 15 illustrates the same arrangement of structures except the diode 26 is located in the printed circuit board 22 and the printed circuit board itself has a reflective coating 92 located on the upper surface thereof. Again, the elements relating to a backlit membrane switch such as actuator layer, snap dome, conductive traces, etc. have been deleted from FIGS. 14 and 15 to facilitate clarity of understanding of the light reflection principle being discussed. Additionally, while the cover 10 in FIGS. 14 and 15 is configured as a keypad cover with raised keys 12 thereon, it is also applicable to a display cover 52 as shown in FIG. 9.

As has been previously discussed with respect to FIGS. 4 through 11, the reflective material 38 is patterned such that a substantial portion of the light emitted from LED 26 passes directly from the LED to the raised key 12 thereby providing illumination of the key. However, additional illumination of the key is provided by that light which is first reflected downward from the undersurface of elements 38 and then reflected upwards by reflective layer 90 or reflective surface 92 in FIGS. 14 and 15 respectively.

A pattern of reflected material 38 as shown in the Figures and particularly FIGS. 14 and 15, can be provided by developing a "photographic negative" of the light distribution as discussed in FIG. 12. This photographic negative is then used to expose a layer which has a reflective layer coated with a positive photoresist (positive photoresist is defined as photoresist which is not polymerized by exposure to light and is polymerized by the lack of exposure to light). The unexposed photoresist (corresponding to the dark portions of the negative) is polymerized and the exposed photoresist (corresponding to the light portion of the negative) is not. A conventional etching process removes the exposed photoresist and the underlying reflective layer. Thus the light portions of the optical filter transmit light from the diode while the dark portions comprised of reflective material, reflect the light from the diode back towards the printed circuit board.

In the above process, the use of a photographic negative could be eliminated by merely locating a reflective layer, coated with a negative photoresist (negative photoresist is defined as photoresist which is polymerized by exposure to light and is not polymerized by the lack of exposure to light), over the diode and then energizing the diode for a sufficient period of time for the photoresist to be exposed. The exposed photoresist (corresponding to the lighted portions closest to the diode) is polymerized and the unexposed photoresist (corresponding to the darker portions away from the diode) remains unpolymerized. Conventional processing removes the unpolymerized photoresist along with the underlying reflective layer. The result is a layer with a denser distribution of reflective material located over the diode, thus reducing the intensity in this area. The portions where the photoresist and reflective layer have been removed allow a greater portion of light from the diode to pass directly to the key.

The choice of positive or negative photoresist, the etching solutions, the exposure times, etc. are well known to those of ordinary skill in the art of photoprocessing and will depend upon the reflective or opaque materials chosen.

FIG. 14 includes a plurality of arrows 94 illustrating light which has traveled directly from light emitting diode 26 to raised key 12. Arrows 96 designate additional light travelling through raised key 12 which has been reflected from the underside of reflective elements 38 and from reflective layer 90. It can be seen that the additional double reflection increases the amount of light provided to keypad 12 resulting in a greater level of illuminance (for the same power LED) or a reduced power requirement of the LED (for the same level of illuminance).

It is understood that the pattern of the opaque reflective elements 38 could be arranged as previously disclosed with reference to FIGS. 3 through 11 so as to provide not only a more uniformly lit raised key 12 but also one having a much brighter illumination. In fact, the formation of an optical filter "negative" as discussed in FIG. 12 could be by means of a photographic/etching process, as previously discussed, in order to form a pattern of reflective elements on the underside of cover 10 (or in a separate layer) which would have the effect of increasing the illumination of backlit membrane switches and displays in general.

Additionally, the use of reflective layers to increase the illumination of raised keys and/or displays could also benefit by utilization of the slots 80 disclosed in conjunction with FIGS. 13a and 13b to improve the independence of adjacent keys and/or displays by reducing "crosstalk" between them.

In view of the above discussion and the drawings appended hereto, numerous modifications and variations of the present invention will be readily obvious to one of ordinary skill in the art. For example, instead of dots, squares or other geometric forms could be used to create the desired density distribution of opaque material. In an preferred embodiment, the density distribution is such that, when combined with the light emitting diode intensity distribution, there is a substantially constant level of illumination at the cover. However, variations in either the intensity distribution from the light emitting diode and/or the density distribution of opaque material could result in variations of light intensity at the cover where desirable. The concept of utilizing a variable transmittance layer is applicable to any backlit switch or computer display, not just those illustrated or discussed in the present application. Other types of light sources could be used in place of the light emitting diodes illustrated herein. For example, miniature incandescent light bulbs would easily substitute for light emitting diodes.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multi-layer backlit membrane switch, said switch comprising:

an at least partially light transmissive external membrane switch cover;
at least one electrical switch;
at least one light source means for illuminating at least a portion of said cover, said at least one light source means having a light intensity distribution along said at least a portion of said cover; and
at least one means for modifying said light intensity distribution along said at least a portion of said cover, said modifying means located at least partially between said light source and said switch cover and comprising a variable transmittance layer, said variable transmittance layer comprising a photoemulsion negative of light distribution from said light source means at said modifying means.

2. A multi-layer backlit membrane switch according to claim 1, wherein said at least one light source means comprises at least one light emitting diode.

3. A multi-layer backlit membrane switch according to claim 1, wherein said at least partially light transmissive outer cover comprises a means for diffusing light passing therethrough.

4. A backlit display, said display comprising:
an at least partially light transmissive outer cover;
at least one light source means for illuminating at least a portion of said cover, said at least one light source means having a variable light intensity distribution along said at least a portion of said cover; and
at least one means for modifying said light intensity distribution along said at least a portion of said cover, said modifying means located at least partially between said light source and said cover and comprising a variable transmittance layer, said variable transmittance layer comprising a photoemulsion negative of light distribution from said light source means membrane at said modifying means.

5. A backlit display according to claim 4, wherein said at least one light source means comprises at least one light emitting diode.

6. A backlit display according to claim 4, wherein said at least partially light transmissive outer cover comprises a means for diffusing light passing therethrough.

7. A multi-layer backlit membrane switch, said switch comprising:
an at least partially light transmissive external membrane switch cover including a key;
at least one electrical switch;
at least one light source means for illuminating at least a portion of said cover, said at least one light source means having a light intensity distribution along said at least a portion of said cover; and
an at least partially light transmissive layer located at least partially between said switch cover and said light source means, said layer including at last one means for reducing light transmittance in a direction parallel to said membrane switch, said reducing means comprising at least one slot, said at least one slot not completely surrounding said key.

8. A multi-layer backlit membrane switch according to claim 7, wherein said reducing means includes a plurality of slots, each of said slots partially surrounding said key, each of said slots separated from an adjacent slot by a portion of said light transmissive layer.

9. A multi-layer backlit membrane switch according to claim 7, wherein said at least one light source means comprises at least one light emitting diode.

10. A multi-layer backlit membrane switch according to claim 7, wherein said at least partially light transmissive outer cover comprises a means for diffusing light passing therethrough.

11. A backlit display, said display comprising:
an at least partially light transmissive outer cover;
at least one light source means for illuminating at least a portion of said cover; and
an at least partially light transmissive layer located at least partially between said outer cover and said light source means, said layer including at least one means for reducing light transmittance in a direction parallel to said backlit display, said reducing means comprising at least one slot, said at least one slot not completely surrounding at least one limited area of said cover.

12. A backlit display according to claim 11, wherein said reducing means includes a plurality of slots, each of said slots partially surrounding said limited area, each of said slots separated from an adjacent slot by a portion of said light transmissive layer.

13. A backlit display according to claim 11, wherein said at least one light source means comprises at least one light emitting diode.

14. A backlit display according to claim 11, wherein said at least partially light transmissive outer cover comprises a means for diffusing light passing therethrough.

15. A multi-layer backlit membrane switch, said switch comprising:
an at least partially light transmissive external membrane switch cover;
at least one electrical switch;
at least one light source means for illuminating at least a portion of said cover, said at least one light source means having a light intensity distribution along said at least a portion of said cover;
at least one means for modifying said light intensity distribution along said at least a portion of said cover, said modifying means located at least partially between said light source and said switch cover and comprising a variable transmittance layer, wherein said layer is comprised of an at least partially light transmissive material, at least portions of which are covered by a material at least partially reflective of visible light from said light source means, said covered portions comprising a percentage of the area of said layer, said percentage varying along said layer;
a further visible light reflective layer means, located with said light source means at least partially between said light reflective layer means and said switch cover, for reflecting visible light from said at least partially reflective material back towards said switch cover; and
an at least partially light transmissive spacer layer at least partially between said further visible light reflective layer means and said at least partially reflective material.

16. A multi-layer backlit membrane switch according to claim 15, wherein said covered portions of said variable transmittance layer is comprised of a plurality of dots of reflective material.

17. A multi-layer backlit membrane switch according to claim 16, wherein said reflective material has an area, and the area of reflective material per unit area of said variable transmittance layer increases and decreases in relation to increases and decreases in light intensity at said layer.

18. A multi-layer backlit membrane switch according to claim 17, wherein there is an even distribution of number of dots but the area of each dot increases and decreases in relation to increases and decreases in light intensity at said layer.

19. A multi-layer backlit membrane switch according to claim 17, wherein said dots are of equal area but the distribution density of dots increases and decreases in relation to increases and decreases in light intensity at said layer.

20. A multi-layer backlit membrane switch according to claim 15, wherein said covered portions of said variable transmittance layer is comprised of a dot of reflective material surrounded by a plurality of concentric circles of reflective material.

21. A multi-layer backlit membrane switch according to claim 20, wherein the reflective material has an area, and the area of reflective material per unit area of variable transmittance layer increases and decreases in relation to increases and decreases in light intensity at said layer.

22. A multi-layer backlit membrane switch according to claim 21, wherein there is an even distribution of number of rings but the area of each ring increases and decreases in relation to increases and decreases in light intensity at said layer.

23. A multi-layer backlit membrane switch according to claim 15, wherein said light source means is located on said reflective layer means.

24. A multi-layer backlit membrane switch according to claim 15, wherein said light source means extends at least partially through said reflective layer means.

25. A backlit display, said display comprising:
an at least partially light transmissive outer cover;
at least one light source means for illuminating at least a portion of said cover, said at least one light source means having a light intensity distribution along said at least a portion of said cover;
at least one means for modifying said light intensity distribution along said at least a portion of said cover, said modifying means located at least partially between said light source and said cover and comprising a variable transmittance layer, wherein said layer is comprised of an at least partially light transmissive material, at least portions of which are covered by a material at least partially reflective of visible light from said light source means, said covered portions comprising a percentage of the area of said layer, said percentage varying along said layer;
a further visible light reflective layer means, located with said light source means at least partially between said light reflective layer means and said cover, for reflecting visible light from said at least partially reflective material back towards said cover; and
an at least partially light transmissive spacer layer at least partially between said further visible light reflective layer means and said at least partially reflective material.

26. A backlit display according to claim 25, wherein said covered portions of said variable transmittance layer is comprised of a plurality of dots of reflective material.

27. A backlit display according to claim 26, wherein said reflective material has an area, and the area of reflective material per unit area of said variable transmittance layer increases and decreases in relation to increases and decreases in light intensity at said layer.

28. A backlit display according to claim 27, wherein there is an even distribution of number of dots but the area of each dot increases and decreases in relation to increases and decreases in light intensity at said layer.

29. A backlit display according to claim 27, wherein said dots are of equal area but the distribution density of dots increases and decreases in relation to increases and decreases in light intensity at said layer.

30. A backlit display according to claim 25, wherein said covered portions of said variable transmittance layer is comprised of a dot of reflective material surrounded by a plurality of concentric circles of reflective material.

31. A backlit display according to claim 30, wherein the reflective material has an area, and the area of reflective material per unit area of variable transmittance layer increases and decreases in relation to increases and decreases in light intensity at said layer.

32. A backlit display according to claim 31, wherein there is an even distribution of number of rings but the area of each ring increases and decreases in relation to increases and decreases in light intensity at said layer.

33. A backlit display according to claim 25, wherein said light source means is located on said reflective layer means.

34. A backlit display according to claim 25, wherein said light source means extends at least partially through said reflective layer means.

35. A method of providing an even distribution of light at a specific plane from a light source means, said method comprising the steps of:
providing a light transmissive substrate covered with a reflective layer, said layer coated with a positive photoresist, positive photoresist is defined as photoresist which is not polymerized by exposure to light and is polymerized by the lack of exposure to light, after completing photoresist processing;
making a negative, by a photographic process, of the light distribution from said light source means at said plane;
locating said negative over said photoresist covered reflective layer;
exposing said photoresist layer to light travelling through said negative;
processing said substrate to polymerize any non-exposed photoresist;
etching all unpolymerized photoresist and associated portions of said reflective layer from said substrate; and
locating said substrate at said plane with said reflective layer towards said light source means, whereas said substrate blocks a greater portion of light from said light source means where the illumination level is higher and said substrate blocks a lesser portion of light from said light source means where the illumination level is lower, resulting in the appearance to an observer of a generally even level of illumination at said plane.

36. A method of providing an even distribution of light at a specific plane from a light source means, said method comprising the steps of:
providing a light transmissive substrate covered with a reflective layer, said layer coated with a negative photoresist, negative photoresist is defined as photoresist which is polymerized by exposure to light and is not polymerized by the lack of exposure to light, after completing photoresist processing;

temporarily locating said substrate and said photoresist covered reflective layer at said plane over said light source means;

exposing said photoresist layer to light from said light source means;

processing said substrate to polymerize any non-exposed photoresist;

etching all unpolymerized photoresist and associated portions of said reflective layer from said substrate; and locating said substrate at said plane with said reflective layer towards said light source means, whereas said substrate blocks a greater portion of light from said light source means where the illumination level is higher and said substrate blocks a lesser portion of light from said light source means where the illumination level is lower, resulting in the appearance to an observer of a generally even level of illumination at said plane.

37. A method of providing an even distribution of light in accordance with claim 35, further including the step of providing a further reflective layer for reflecting light from said light source means and said substrate towards said substrate.

38. A method of providing an even distribution of light in accordance with claim 36, further including the step of providing a further reflective layer for reflecting light from said light source means and said substrate towards said substrate.

* * * * *